United States Patent
Crawford

[11] Patent Number: 6,056,028
[45] Date of Patent: May 2, 2000

[54] PORTABLE FUELING APPARATUS

[76] Inventor: Dale W. Crawford, P.O. Box 219, Salvo, N.C. 27972

[21] Appl. No.: 08/990,407

[22] Filed: Dec. 15, 1997

Related U.S. Application Data

[60] Provisional application No. 60/045,924, May 7, 1997.

[51] Int. Cl.[7] .................................................. F02B 77/00
[52] U.S. Cl. .......................... 141/382; 141/98; 141/231; 137/883; 222/74; 123/198 R
[58] Field of Search .............................. 141/98, 230, 231, 141/382; 137/883; 123/198 R, 456; 222/74

[56] References Cited

U.S. PATENT DOCUMENTS

| | | | |
|---|---|---|---|
| 2,656,828 | 10/1953 | Conover | 123/198 R |
| 2,948,306 | 8/1960 | Kuraeff | 141/231 |
| 3,011,510 | 12/1961 | Standifird | 137/151 |
| 3,384,132 | 5/1968 | Lisciani | 141/230 |
| 3,750,906 | 8/1973 | Hansel | 222/74 |
| 3,774,654 | 11/1973 | Hjermstad | 141/382 |
| 3,814,148 | 6/1974 | Wostl | 141/98 |
| 3,920,056 | 11/1975 | Piecuch | 141/231 |
| 5,092,294 | 3/1992 | Jackson | 123/198 C |
| 5,230,374 | 7/1993 | Dawson et al. | 141/231 |
| 5,649,574 | 7/1997 | Turcotte et al. | 141/98 |
| 5,718,260 | 2/1998 | Leonardi | 137/355.16 |

Primary Examiner—J. Casimer Jacyna
Attorney, Agent, or Firm—Donald C. Casey, Esq.

[57] ABSTRACT

A portable vehicle fueling device is described wherein fuel is dispensed directly from the vehicle fuel tank directly from the vehicle fuel tank by the vehicle fuel pump through the hose of this invention so that a supply of gasoline can be provided for auxiliary engines such as boat, lawn mowers, and the like. A Schrader valve is provided in the fuel line and the portable device of this invention includes a coupling for opening the Schrader valve at the end of the hose and a nozzle at the opposite end.

2 Claims, 3 Drawing Sheets

PORTABLE FUELING APPARATUS

CROSS REFERENCE TO RELATED APPLICATION

This application is based on provisional application number 60-045,924, filed May 7, 1997.

BACKGROUND OF THE INVENTION

1. Field of the Invention

This invention relates to a new way to access gasoline from the gas tanks of automobiles, trucks and the like to provide fuel for auxiliary engines such as boats, motorcycles, law mowers, and the like, without siphoning the same from the vehicle gasoline tank.

2. Description of the Prior Art

Siphoning gasoline from a gas tank has been used for many years to provide a source of fuel for auxiliary sources. According to a well known former method a hose is inserted through the neck of the gas tank into the tank itself and the hose is evacuated to draw gasoline from the tank. Typically, the hose is evacuated by sucking the air therefrom which places the user in contact with the gasoline and there are known manual pump means for pumping the air from the hose also. Since the 1970's however, automobiles have had n anti-rollover device in the tank to prevent fuel from flowing from the tank if the vehicle is on its side or upside down. This anti rollover device also blocks siphoning hoses so that the conventional, old fashioned means for siphoning gasoline from the tank is no longer applicable.

Accordingly there is a need for a means for removing fuel from a gas tank as need to fuel auxiliary engines.

BRIEF SUMMARY OF THE INVENTION

The instant invention consists of a hose and nozzle. The nozzle is attached at one end of the hose and is normally closed. The nozzle may be a conventional gasoline dispensing nozzle with a trigger actuator. The fuel line which supplies the engine or carburetor with fuel has an access valve which is a Schrader valve. When the end of the hose of this ably received on the Schrader valve, it Will same permitting a flow of gasoline from the tank utilizing the vehicle fuel pump. When sufficient gas has been removed the threaded end of the hose is removed from the valve and the valve automatically closes for conventional operation of the vehicle.

Accordingly it is the object of this invention to provide a portable device for removing fuel from a vehicle fuel tank quickly and efficiently.

It is another object of this invention to provide a portable device which may be attached to a valve mounted on the vehicle fuel line so that the vehicle fuel pump will pump fuel from the fuel tank through the hose to withdraw the same from the system.

It is another object of this invention to provide a portable device for removing fuel from a vehicle fuel system which uses the vehicle fuel pump instead of a manual siphon.

These and other objects will become readily apparent with reference to the drawings and following description wherein:

DETAILED DESCRIPTION OF THE INVENTION

Figure 1:
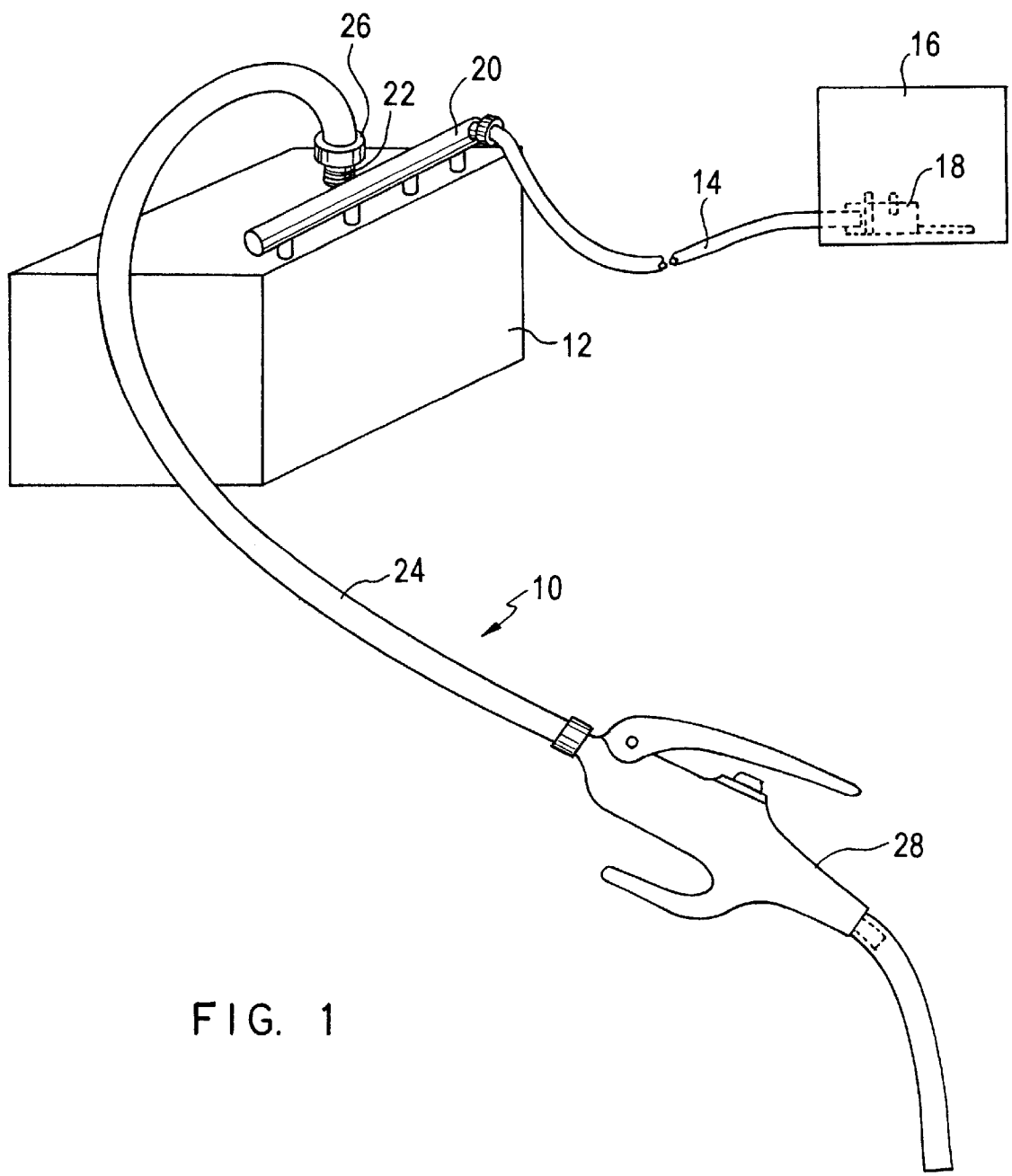
FIG. 1 is a schematic view of the device of this invention on a vehicle engine fuel rail.

With attention to the drawings and FIG. 1 in particular there is shown the device of this invention 10 mounted on a gasoline engine 12 which is connected by a fuel line 14 to a fuel tank 16 which contains a conventional fuel pump 18. Gasoline rail 20 is provided on the engine 12 and a Schrader valve 22 is mounted on the rail. A Schrader valve is a valve opened by pressing a biased nipple in the conventional fashion. The device of this invention includes a hose 24 which typically is about six feet long and which has a connection end which mounts a threaded coupling 26 and a dispensing end which mounts a nozzle 28. Nozzle 28 is a conventional fuel dispensing nozzle as will be subsequently described and coupling 26 as also will be subsequently described has an internal post for depressing the nipple on the Schrader valve 22.

Figure 2:
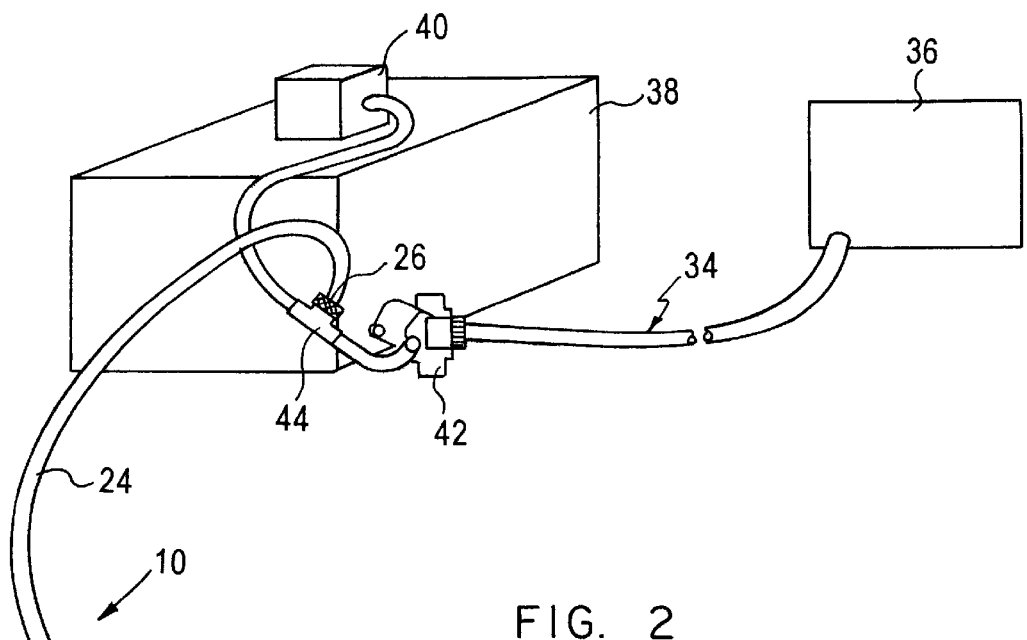
FIG. 2 is a schematic view of the device of this invention mounted in a conventional fuel line.

With attention to FIG. 2, FIG. 2 shows the device of this invention 10 mounted on the fuel line 34 connecting a fuel tank 36 and a conventional gasoline engine 38 at its throttle or carburetor 40. A mechanical fuel pump 42 is provided in the gas line 34 and a T connector according to this invention 44 is mounted in the line downstream of the fuel pump between the pump and carburetor or throttle 40. Activation of the fuel pump then when the Schrader valve (not shown) in the T, 44, is opened will result in filling the hose 24 so that gas can be automatically dispensed directly from nozzle 28.

Figure 3:
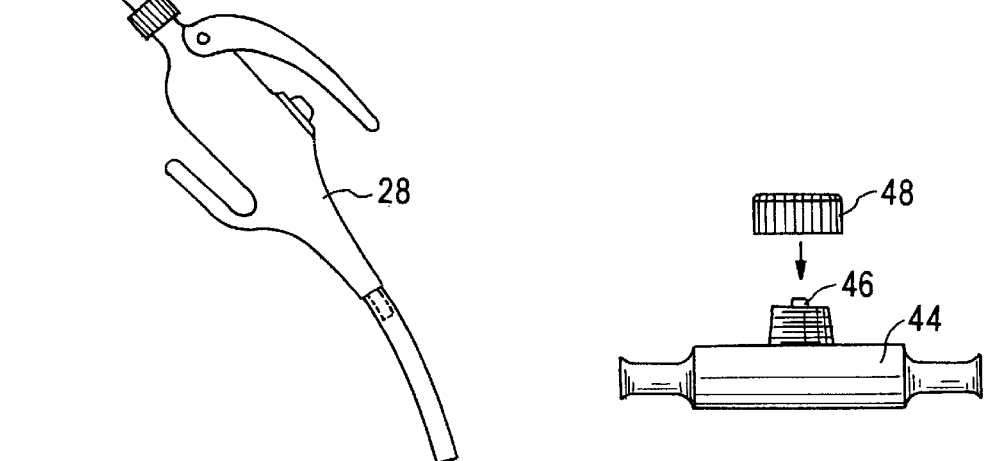
FIG. 3 is a fragmentary exploded view of the Schrader valve T connection in the fuel line of FIG. 2.

With attention to FIG. 3, the T connector 44 includes the Schrader valve 46 and a valve cap 48 which is used to close the valve 46 when the device of this invention 10 is not attached.

Figure 4A:
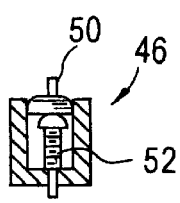
FIG. 4A is a cross-sectional view of a Schrarder valve in the closed position.
Figure 4B:
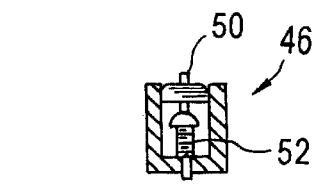
FIG. 4B is a cross-sectional view of a Schrader valve in an open position.

With reference to FIGS. 4A And 4B, the Schrader valve has a nipple 50 which extends from the top thereof so that when the nipple 50 is depressed the valve stem 52 will also be depressed opening the valve as shown in FIG. 4B.

Figure 5:
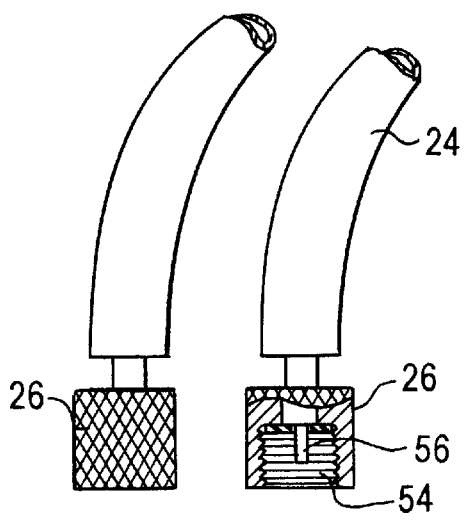
FIG. 5 is fragmentary view of the connection end of the device of this invention in partial cross-section showing the threaded connection to the Schrader valve.
Figure 6:
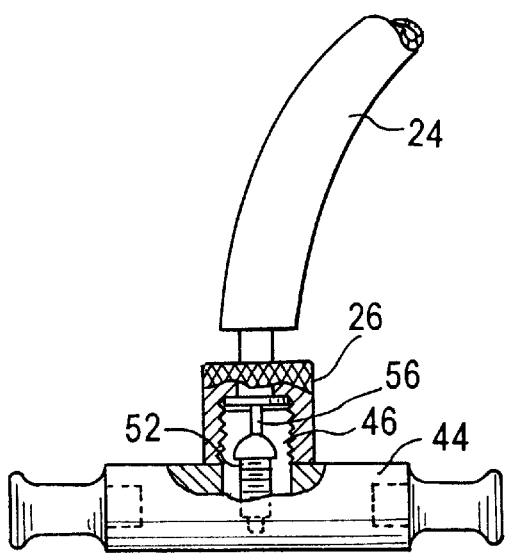
FIG. 6 is a fragmentary view and partial cross section showing the connection end of the device of this invention mounted on a Schrader valve.
Figure 7:
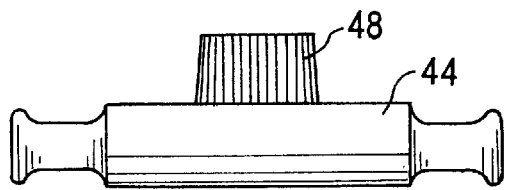
FIG. 7 is a fragmentary view of the T connection with the vehicle fuel line.

With reference to FIG. 5, the hose of this invention 24 has a coupling 26 which has an internal threaded portion 54 for receiving the threaded end of the Schrader valve 46 and an internal rigid post 56 for depressing the nipple 50 of the Schrader valve 46. With attention to FIG. 6 then the T connector 44 is permanently mounted in the fuel line 44 downstream of the fuel pump 42 and the T connector then mounts the Schrader valve 46 which in turn receives the coupling 26 of hose 24 whereby post 56 opens the valve stem 52. FIG. 7 shows the T connector 44 with the valve cap 48 attached when the device of this invention is not in use.

Figure 8:
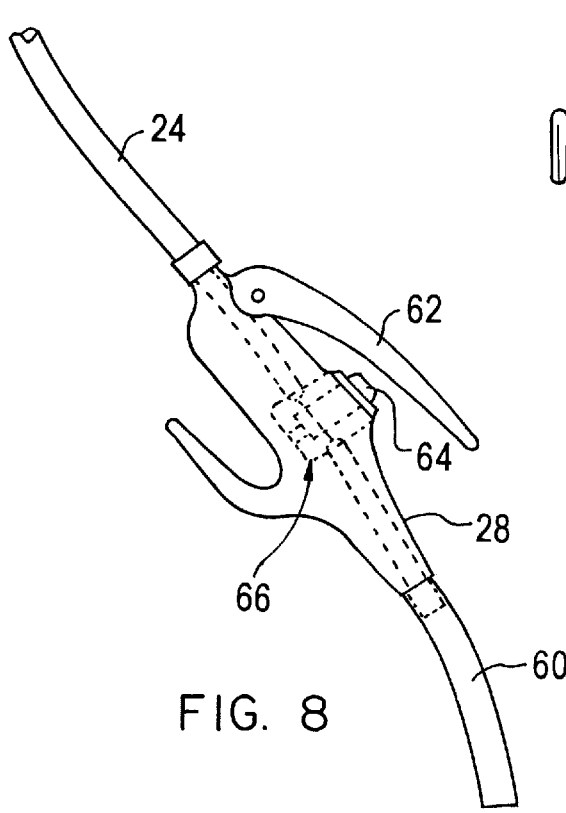
FIG. 8 is a fragmentary view of the nozzle end of the device of this invention.
Figure 9:
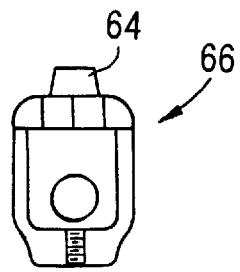
FIG. 9 is a fragmentary view of the nozzle valve of FIG. 8.

With attention to FIG. 8 and 9 the opposite end of hose 24 mounts a nozzle 28 which in turn can have a clear hose extension 60 so that gas passing through the nozzle 28 can be visually observed. Nozzle 28 is a conventional nozzle which typically uses a trigger handle 62 to depress a valve stem 64 to open the valve 66 when the handle is depressed and to permit closure of the valve when the handle is released as shown FIG. 8.

In summary, the device of this invention utilizes a T connection in the fuel line or a Schrader valve directly attached to the engine fuel rail whereby the device of this invention can be coupled at one end to the Schrader valve opening the same and a nozzle at the opposite end used to dispense gasoline directly from the vehicle fuel tank via the vehicle fuel pump.

What is claimed is:

1. A portable device for withdrawing fuel from a vehicle having a fuel tank, an engine, and a fuel line connecting the tank and the engine and having a fuel pump coupled to said fuel line to normally pump fuel from said tank through said line to said engine comprising:

a Schrader valve having an inlet and an outlet adapted to be coupled to said fuel line with the inlet in communication therewith, said Schrader valve being normally closed;

a T joint having an inlet and an outlet, said inlet being adapted to be disposed in said fuel line downstream of said fuel pump and said outlet being adapted to be disposed in said fuel line downstream of said inlet so that fuel from said tank pumped by said fuel pump normally passes through said T-valve joint, said joint mounting said Schrader valve;

a conduit adapted to be coupled at one end to the outlet of said Schrader valve;

a coupling mounted on said conduit at said one end normally engaging said Schrader valve, said coupling mounting an internal post so that when said coupling engages said Schrader valve said post opens said valve and the outlet therein whereby said valve places said fuel line in communication with said conduit; and a fuel dispensing nozzle mounted at the opposite end of said conduit.

2. The device of claim 1 wherein said outlet nozzle terminates in a section of clear plastic pipe whereby fuel dispensed can be visually observed.

* * * * *